(12) United States Patent
Ulrich et al.

(10) Patent No.: US 7,335,010 B2
(45) Date of Patent: Feb. 26, 2008

(54) DEVICE FOR PRODUCING RIGID PLASTIC PIPES

(75) Inventors: Herbert Ulrich, Emsdetten (DE); Joachim Werner, Hamminkeln (DE)

(73) Assignee: Egeplast Werner Strumann GmbH & Co. KG, Emsdetten (DE)

( * ) Notice: Subject to any disclaimer, the term of this patent is extended or adjusted under 35 U.S.C. 154(b) by 132 days.

(21) Appl. No.: 11/229,794

(22) Filed: Sep. 19, 2005

(65) Prior Publication Data

US 2006/0034965 A1    Feb. 16, 2006

Related U.S. Application Data

(63) Continuation-in-part of application No. 09/787,981, filed as application No. PCT/DE99/02708 on Aug. 24, 1999, now abandoned.

(30) Foreign Application Priority Data

Sep. 22, 1998  (DE) ................ 198 43 340

(51) Int. Cl.
*B29C 47/90* (2006.01)

(52) U.S. Cl. ............ 425/326.1; 425/71; 425/392

(58) Field of Classification Search ........... 425/71, 425/72.1, 325, 326.1, 392
See application file for complete search history.

(56) References Cited

U.S. PATENT DOCUMENTS

| 2,559,386 A | * | 7/1951 | Bailey ............ 425/326.1 |
| 3,753,633 A | | 8/1973 | Van Kralingen |
| 3,930,781 A | | 1/1976 | Upmeier |
| 3,958,913 A | | 5/1976 | Stangl |
| 3,980,418 A | | 9/1976 | Schott, Jr. |
| 4,355,966 A | | 10/1982 | Sweeney et al. |
| 4,683,094 A | | 7/1987 | Sharps, Jr. |
| 4,815,957 A | | 3/1989 | Schnell et al. |
| 5,700,489 A | * | 12/1997 | Pottorff ............ 425/72.1 |
| 5,891,481 A | | 4/1999 | Pedersen |

FOREIGN PATENT DOCUMENTS

| AT | 401 031 B | 5/1996 |
| DE | 1 923 490 | 11/1970 |
| DE | 24 12 818 A1 | 9/1975 |
| DE | 35 21 321 A1 | 12/1986 |
| DE | 40 02 884 A1 | 4/1991 |
| EP | 0 356 957 A2 | 3/1990 |
| EP | 0 425 944 A2 | 5/1991 |
| GB | 1 380 397 | 1/1975 |
| GB | 2 182 603 A | 5/1987 |
| WO | 95/27601 | 10/1995 |
| WO | 96/36475 | 11/1996 |

* cited by examiner

*Primary Examiner*—Robert B. Davis
*Assistant Examiner*—Joseph Leyson
(74) *Attorney, Agent, or Firm*—Laurence A. Greenberg; Werner H. Stemer; Ralph E. Locher

(57) ABSTRACT

A device for producing rigid plastic pipes of an approximately cylindrical shape, contains an extruder and a calibrating station following in the direction of production, which has calibrating tools to calibrate the outside diameter of the already partly hardened pipe. The calibrating tools bear against the outside wall of the pipe, lamellae serving as calibrating tools being respectively connected to spindles, which, for adaptation to different outside diameters of pipes that are to be calibrated, being adjustable in a radial direction perpendicular to the axis of the calibrating device and feed axis of the pipe that is to be extruded.

8 Claims, 4 Drawing Sheets

DEVICE FOR PRODUCING RIGID PLASTIC PIPES

CROSS REFERENCE TO RELATED APPLICATION

This application is a continuation-in-part of now abandoned application Ser. No. 09/787,981 filed on Mar. 22, 2001; which is a national stage application of copending international application No. PCT/DE99/02708, filed Aug. 24, 1999, which claimed the benefit of German patent application No. 198 43 340.9 filed Sep. 22, 1998, the prior applications are hereby incorporated by reference in their entirety.

BACKGROUND OF THE INVENTION

Field of the Invention

The present invention relates to a device for producing rigid plastic pipes of an approximately cylindrical shape, containing an extruder and a calibrating station following in the direction of production, which has calibrating tools to calibrate the outside diameter of the already partly hardened pipe, the calibrating tools bearing against the outside wall of the pipe.

In equipment that produces plastic pipes there is the problem that pipes of different outside diameters must be produced with at the same time different wall thicknesses. In the prior art, it is necessary in this respect that, in accordance with the outside diameter of the pipe and the desired wall thickness of the pipe, usually standardized in dependence on the outside diameter, corresponding molds must be exchanged. This requires stopping of the machine, a great amount of work is to be performed to exchange the molds and loss of polymer material until the new pipe can again be drawn. Appropriate drawing of the pipe to allow a pipe of smaller wall thickness to be produced with an existing outside diameter is impossible, since the molecular chain of the plastic is stretched and thereby oriented in such a way as to adversely influence the strength of the pipe, but be conducive to shrinking and folding.

In U.S. Pat. No. 5,630,982, a vacuum calibrating box through which the extruded pipe is conveyed is used as a calibrating device, a number of rings in the calibrating box, through which the pipe passes, serving as calibrating tools, the ultimate outer diameter of the pipe being determined by the rings. Consequently, a fine adaptation of the outer diameter takes place by these rings. Possible eccentricities or ovalities of the pipe at the outer circumference can be compensated by the vacuum calibrating box being displaced in the transverse direction. In the case of such a device, the order of magnitude of the outer diameter of the pipe to be calibrated is already fixed after the extrusion, before the calibration is performed. The calibrating rings used in the calibrating device are not adjustable in their diameter, and consequently can only bring about a correction to a prescribed set diameter. If in the case of such an extrusion device a changeover is made to a completely different set diameter, that is to say pipes with a much larger or much smaller diameter are to be produced, the production operation must be interrupted in order to replace the calibrating tools by calibrating rings that match the set diameter then intended. It is therefore not possible to perform a changeover to different set diameters during the production phase that is in progress.

Published, non-prosecuted German patent application DE 24 12 818 A1 discloses a generic device for calibrating a pipe of thermoplastic material emerging from an extruder, calibrating lamellae being arranged in sequence, as seen in the direction of production of the pipe, in the case of this known arrangement. Each calibrating lamella has a calibrating passage, which is the same and unchangeable for all the sequential calibrating lamellae. Each calibrating lamella interacts with a lamella segment which can be lifted off upward and can be lifted off during the starting phase of production, so that the placing of the pipe leaving the extruder or the pipe die head into the calibrating passage is facilitated. A variation of the pipe diameter during the production process is not possible here and is not suggested.

It has become known from published, non-prosecuted German patent application DE 35 21 321 for metal bellows which can be changed in their inner diameter by stretching or compressing to be provided in a calibrating station. In this way it is intended to make allowance for the changing outside diameter caused by the shrinkage of the polymer material occurring during cooling down, in order as a result to make it possible for the pipe to be guided well in the calibrating station even during the cooling phase and with the possibly decreasing outside diameter of the pipe.

Finally, it has become known from International patent disclosure WO 95/27601 for shaping tools formed by individual rollers to be provided in the interior of the pipe that is to be formed in a non-generic production process for plastic pipes, it being possible for the pipe diameter to be changed by a greater or lesser widening of the outside diameter of the circumferential circle determined by the shaping tools. However, here it is intended for the pipe to be formed by a sheet which is wrapped around this shaping tool, it being intended that the end edges of the sheets are welded to one another. Special pressure rollers act on the weld seam produced when joining the two sheets, in such a way that this weld seam is no longer to be perceptible from the outside.

U.S Pat. No. 3,980,418 discloses a method for extruding flexible tubes which are inflated. This blow-molding is an entirely different technology than the production of rigid cylindrical pipes by extrusion. In blow-molding, a flexible tube which is comparatively thin in wall thickness is extruded and, on account of this small wall thickness, is so flexible even after the cooling of the polymer that it can be laid flat at the end of the extrusion line and can be wound up in this flat form. In the case of these blow-molding processes, the extrusion line generally runs vertically and the inflated tube is drawn upward. In the case of this blow-molding process, the still soft, hot melt is inflated after leaving the extruder, the desired outside diameter being regulated by the internal pressure of the air in the tube. The tube that has reached the desired diameter, which tube is cooled by use of a cooling ring, then runs through a guiding device, which surrounds the tube over a certain conveying distance. This guiding device also serves the purpose of giving the tube the desired circular shape by bearing against the outer circumference of the tube. This guiding device has a number of segments which can bear against the outside diameter of the tube. Each segment is connected to an adjustable arm which can pivot about an axis, so that, by a pivoting movement of the arm about its outer pivoting axis and additionally a compensating pivoting movement of the segment about a second, inner pivoting axis, an adaptation is possible at the outer circumference of extruded tubes with deviating outside diameters.

Changing the outside diameter of the extruded tube after leaving the extruder is possible in the case of such a blow-molding process by changing the internal pressure of the tube during the inflation. If the internal pressure (inflating pressure) is increased, the bubble of plastic leaving the extruder is inflated in a way corresponding to a larger outside diameter, in a way similar to an air balloon. This is of course only possible because the wall thickness of the extruded tube is low and the inflation of the melt can only take place as long as it is still warm enough to be in a plastic state.

In the production of rigid plastic pipes with a correspondingly thick wall thickness, the so-called calibration takes place in the calibrating station the pipe being cooled simultaneously, where the pipe has already cooled to the extent so that it is beginning to harden and its outside diameter dimension substantially is already fixed. The outside diameter of such a rigid pipe cannot be changed by changing an internal pressure. In the production of rigid pipes from plastic, a change of the set diameter during the production phase was therefore not possible with the known extrusion devices.

U.S. Pat. Nos. 3,930,781, 3,753,633 and 4,683,094 all describe devices for producing plastic tubes by blow-molding, in the case of which the film-like tube is laid flat after completion of the extrusion operation and is transported further in such a flat form. To the extent that changing of the diameter of the blow-molded tube or calibration of the outside diameter by adjustable calibrating devices is described in these documents, the same statements as were made above in relation to U.S. Pat. No. 3,980,418 apply with regard to the lacking comparability with the technology of the production of rigid pipes.

SUMMARY OF THE INVENTION

The invention is based on the object of providing a device for the extrusion of rigid plastic pipes in which it is possible during the production phase of the pipe to permit a possibly fully automatically controlled changeover between different outside diameters (set diameters, dimensions) of the plastic pipes in a continuous production process without interrupting the production operation.

The solution achieving this object is obtained by the device for producing plastic pipes according to the invention. The device contains an extruder and a calibrating station following in the direction of production, which has calibrating tools to calibrate the outside diameter of the already partly hardened pipe. The calibrating tools bear against the outside wall of the pipe, wherein lamellae serving as calibrating tools are respectively connected to spindles, which, for adaptation to different outside diameters of pipes that are to be calibrated, are adjustable in a radial direction perpendicular to the axis of the calibrating device and feed axis of the pipe that is to be extruded.

The subject matter of the present invention relates also to a method for producing the rigid pipes. The present invention provides that, in the case of a method for producing rigid pipes from plastic of an approximately cylindrical shape in the case of which, while cooling the polymer melt, the latter is beginning to be hardened and consequently the order of magnitude of the outside diameter (dimension) of the then largely rigid pipe is fixed, a changeover between different outside diameters (set diameters) of the pipe takes place during the production phase of the pipe without interrupting the production operation. This was not possible in the case of the systems known from the prior art for the extrusion of rigid pipes from plastic, since the calibrating device used was adapted to a specific outside diameter of the pipe. Accordingly, when a change of production was desired in the past, with a changeover to the production of pipes with an entirely different set diameter, the system was stopped and the extrusion process interrupted. The corresponding components in the region of the calibrating device, in particular calibrating sleeves or calibrating tools, were exchanged and replaced by other calibrating tools which corresponded to the new set diameter of the pipe to be extruded. Only after a corresponding conversion of the device, which generally took several hours, could the extrusion process be recommenced. In the case of the method according to the invention, this is different, since a changeover between different outside diameters (set diameters) of the pipe is possible during the production phase without interrupting the production operation. The changing of the diameter generally takes place in the so-called vacuum suction bell, which is arranged between the pipe die head, from which the extruded melt strand emerges, and the calibrating device. In the region of the vacuum suction bell, the melt strand is still soft, so that a changeover of the set diameter can be performed there, either by the melt strand being sucked up by means of a vacuum, which leads to an increase in diameter, or by a positive pressure being generated within the housing of the vacuum suction bell compared with the internal pressure prevailing in the interior space of the extruded tube, which then leads to a reduction of the diameter with respect to the diameter of the melt strand emerging from the pipe die head of the extruder.

An extrusion system according to the present invention can also work without the vacuum suction bell, as it is possible to influence the pipe diameter by other parameters. These are especially the opening of the pipe die head of the extruder, the distance between the pipe die head and the calibrating station, and the velocity of drawing the extruded pipe in the direction of production by a device, which generally is situated at the end of the extrusion line.

According to one preferred embodiment of the invention, when there is a change of the set diameter, the changing of the diameter is performed in the region of the vacuum suction bell, in which the melt strand is still soft. Subsequently, the pipe set to the desired set diameter hardens in the region of the calibrating device, in which there is then a virtually rigid pipe. The method according to the invention then provides that, in order to make such calibration of a pipe of changed diameter possible, the calibrating tools of the calibrating device adjust themselves radially in a way corresponding to the then prescribed, new set diameter of the pipe, so that they set themselves to the new outside diameter of the pipe and bear again against the outer circumference of the pipe with the then changed set diameter. All this takes place while the production process is in progress. The radial adjustment of the calibrating tools can in principle be performed manually. However, this radial adjustment of the calibrating tools preferably takes place automatically, which according to a development of the method can take place by the outside diameter of the melt strand in the vacuum suction bell being measured by a measuring device and, after that, the lamellae of the calibrating device automatically adjusting themselves radially, in dependence on this measured new outside diameter, and setting themselves to the new outside diameter. In the case of the method according to the invention, a conical intermediate piece of the extruded pipe is created by the changeover of the outside diameter during the production phase in the continuous extrusion process, since in the transitional phase the set diameter continuously increases or decreases until the desired new set diameter is reached. This is unproblematical, however, since this conical intermediate piece of the pipe can simply be cut out at the end of the extrusion line, so that the pipe with the first set diameter, upstream of the intermediate piece, and also the pipe with the second set diameter, downstream of the intermediate piece, can be used once the intermediate piece has been cut out.

The calibrating station provided according to the invention is preferably formed by a multiplicity of lamellae, which are arranged such that they are distributed around the outside of the pipe to be calibrated, over the circumference, in each case forming a ring of lamellae. Here, the production rings are arranged within the calibrating station, the individual lamellae of the individual lamella rings being staggered, so that problem-free adjustment of the individual lamellae of the individual ring with respect to the lamellae of the following ring or of the preceding ring is possible.

The adjustment of the lamellae takes place by use of a motor or manually, a single manual control allowing all the lamella rings to be adjusted at the same time.

The rounding of the lamellae with which the latter bear against the outside of the pipe can correspond to the largest pipe diameter to be produced. If smaller pipe diameters are produced, the treated pipe is therefore not ideally round, but instead is made up of small, adjoining roundings, which are then equalized inside the calibrating bath.

Further features and advantages of the present invention become clear from the following description of preferred exemplary embodiments with reference to the accompanying illustrations.

DESCRIPTION OF THE PREFERRED EMBODIMENTS

Figure 1:
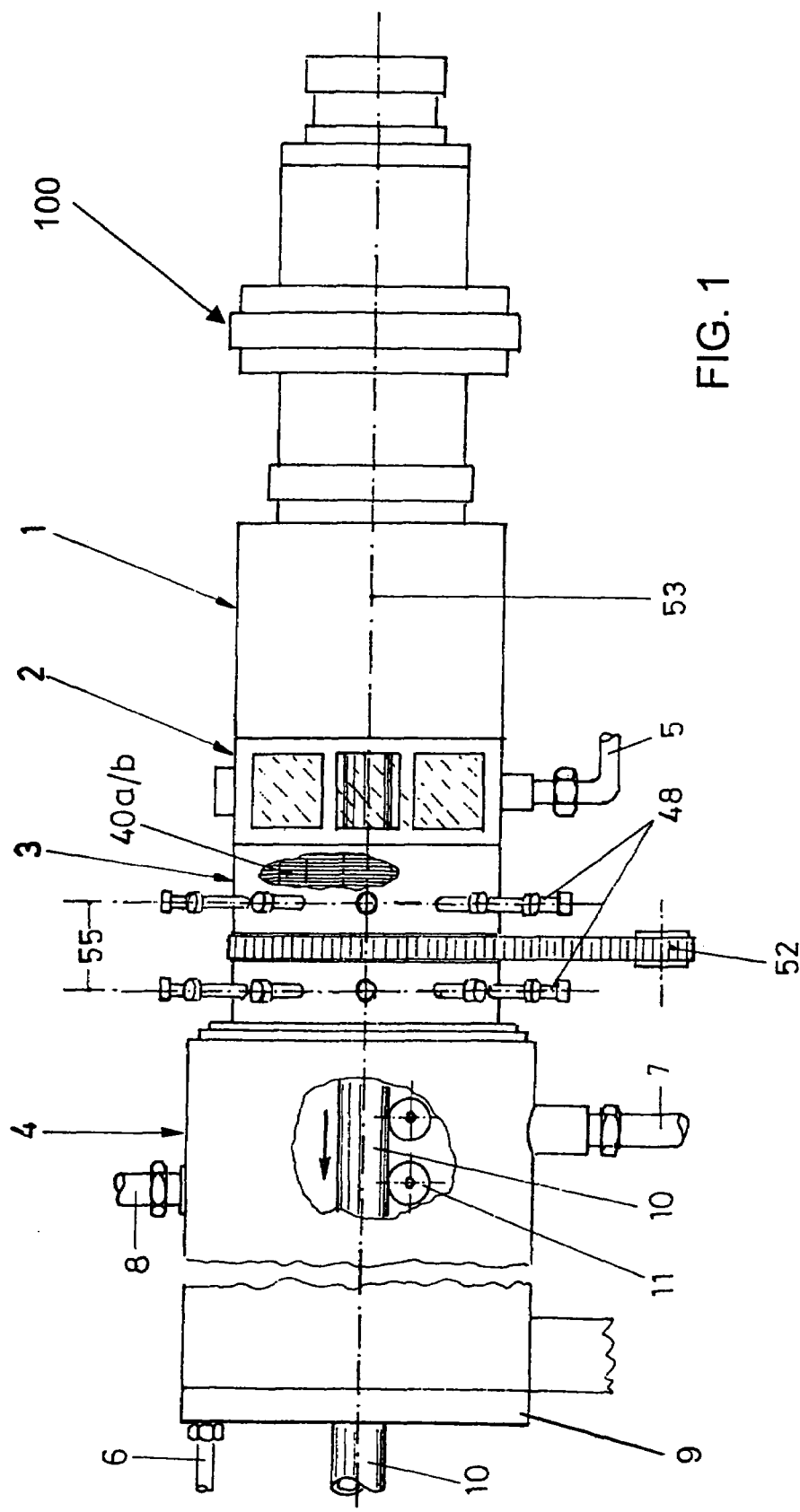
FIG. 1 shows an overall view of the extrusion system according to the invention from outside.

In FIG. 1 there can be seen an adjustable pipe die head 1, which, as seen in a direction of production, follows an extruder 100, only partially diagrammatically represented in the drawing. The adjustable pipe die head 1 is followed by a vacuum suction bell 2, which is equipped with a vacuum connection 5, in which measuring devices which set the vacuum prevailing in the suction bell 2 in dependence on the desired outside diameter of a pipe 10 are provided, so that as a result the tubular melt stream is set to the desired outside diameter, i.e. is sucked up, it being possible for a pre-cooling of the melt strand already to take place in the vacuum suction bell 2.

The vacuum suction bell 2 is followed by a calibrating station 3. The exact calibration of the outside diameter of the melt strand, and of the already partially hardened pipe, takes place here by a mechanical central adjustment, it being possible for the calibrating station 3 to be used for all plastics that come into consideration. In the calibrating station 3 an adaptation to pipes with different outside diameters is possible.

In a vacuum calibrating bath 4 which follows, as seen in the direction of production, the final cooling and hardening of the plastic pipe then take place by spray water, the drawing showing a water feed 6 and a water outlet 7. Furthermore, the vacuum calibrating bath 4 is followed by a vacuum connection 8, and the pipe 10 located in the vacuum calibrating bath 4 runs over supporting rollers 11, which may also be referred to as calibrating rollers 11, and allows itself to be set to the desired pipe diameter. The surface of the pipe 10 is relatively hard and the pipe 10 leaves the vacuum calibrating bath 4 through a vacuum seal 9, which either sets itself to the pipe diameter of its own accord or is set in dependence on the set pipe dimensions in the calibrating station 3 and/or in the vacuum calibrating bath 4. Shaping rollers, which are actuated hydraulically or by mechanical springs, may be arranged in the vacuum seal 9, it being possible at the same time for water to be introduced here into the passage of the pipe for lubrication and sealing.

Figures 2A, 2B:
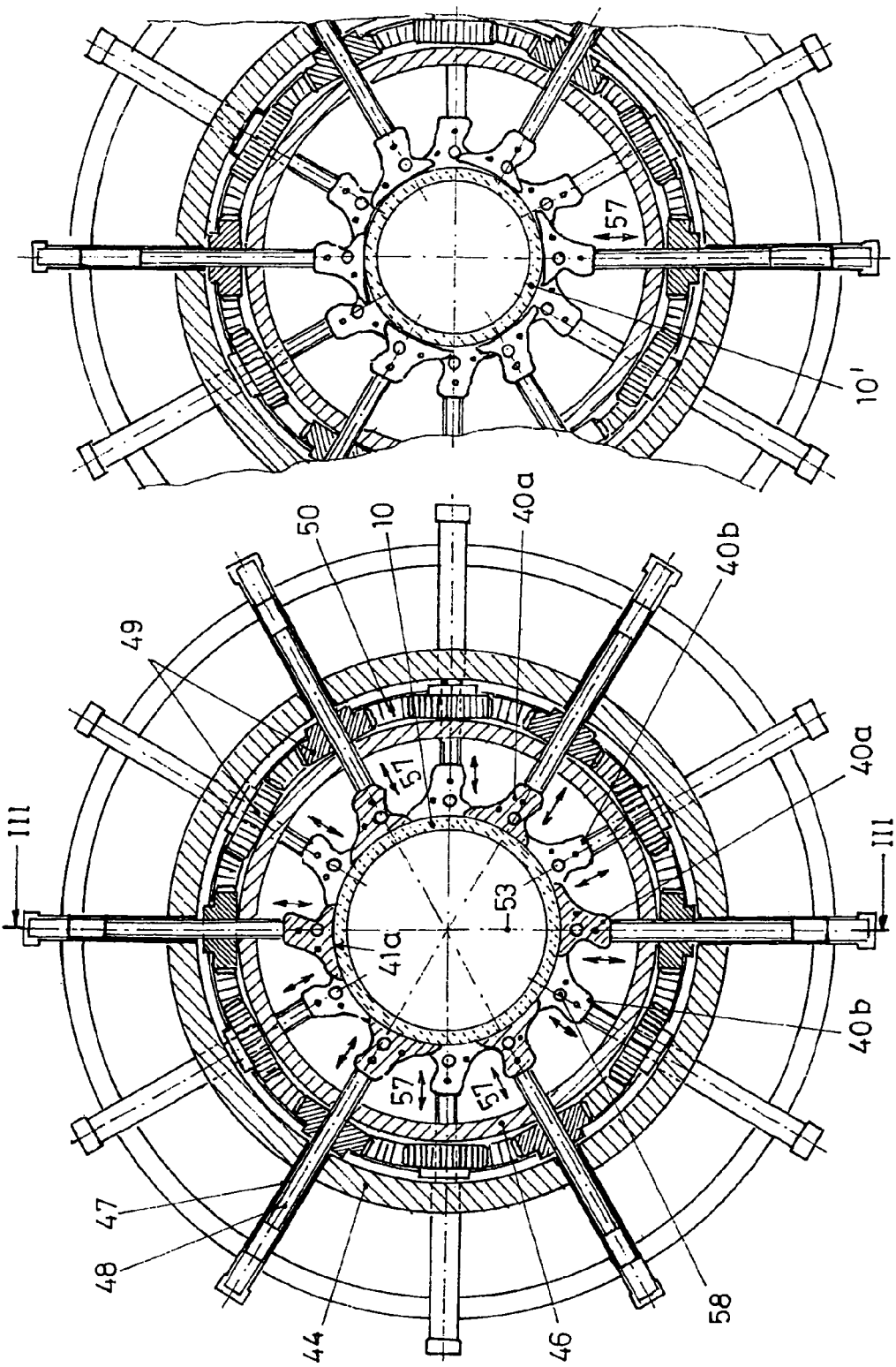
FIG. 2A shows a cross section through an extrusion system according to the invention in the region of the calibrating device in a first position of the calibrating tools.
FIG. 2B shows a cross section through an extrusion system according to the invention in the region of the calibrating device in a second position of the calibrating tools.
Figure 3B:
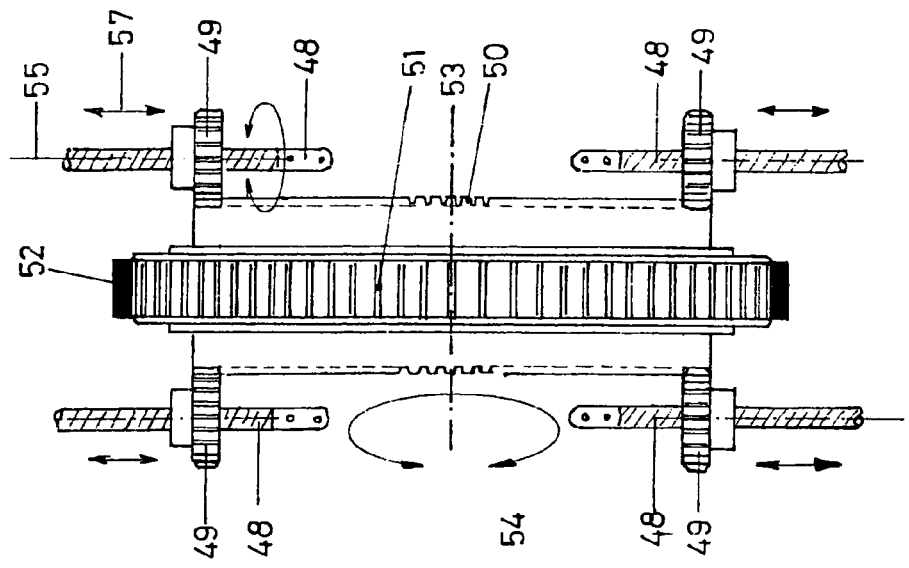
FIG. 3B shows a schematically simplified side view of the extrusion system in the region of the mechanism for adjusting the calibrating tools.
Figure 3A:
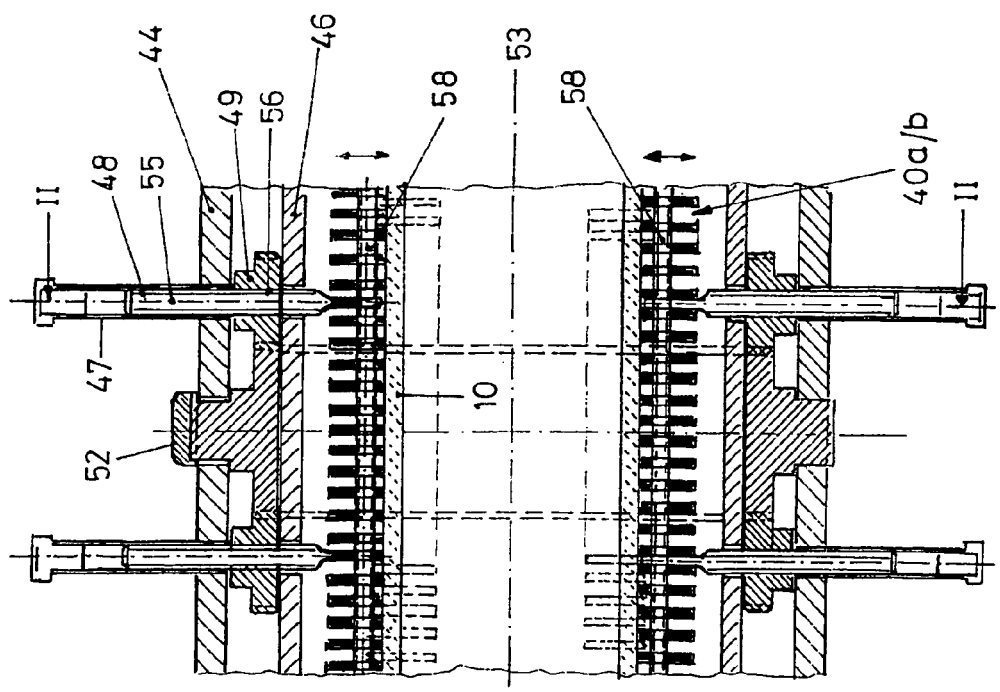
FIG. 3A shows a partial longitudinal section through the extrusion system in the region of the calibrating device in a first position of the calibrating tools.

FIGS. 2A, 2B and 3A respectively show cross sections and a longitudinal section through an embodiment of the calibrating station 3. It can be seen that a multiplicity of lamellae 40a, 40b, which are arranged over the circumference of the pipe 10 and bear against the outside pipe wall of the pipe 10, are arranged within an outer wall 44 of the calibrating station 3. A bearing edge 41a of each lamella 40a, 40b has in this case a rounding, which corresponds to the largest possible outside diameter of the pipe 10. It can be seen from FIGS. 2A-3B that a multiplicity of lamella rings are arranged one behind the other, as seen in the direction of production of the pipe. In the case of the representation in FIGS. 3A, 3B, a multiplicity of lamella rings are arranged and, according to FIGS. 2A, 2B, each lamella ring is formed by six lamellae 40a, 40b; however, the invention is in no way restricted to this.

As an alternative to the embodiment according to FIG. 2A, adjusting motors, which, under joint control, bring about a joint adjustment of all the lamella rings, may also be provided, it also being possible here for the adjustment of the adjusting motors to take place in a centrally controlled manner with the corresponding control in the suction bell 2 and the calibrating bath 4.

The housing of the extrusion system contains in the region of the outer wall 44 of the calibrating device 3 and, arranged eccentrically thereto, an inner wall 46, between which gear wheels 49 are respectively arranged, the gear wheels 49 respectively being assigned to an adjusting unit with a threaded spindle 48. For the radial adjustment of the lamellae 40a, 40b, each threaded spindle 48 moves in each case in a radial direction within a spindle housing 47, which extends radially through bores in the outer wall 44 of the housing of the system. The bearing edges 41a of the lamellae 40a, 40b in each case form bearing portions on the outer circumference of the extruded pipe 10. For this purpose, the bearing edges 41a in each case have the form of arcuate portions, so that, given a specific pipe diameter as shown in FIGS. 2A, 2B, they bear against the circumference of the outer wall of the pipe 10. With pipe diameters deviating from this, there is of course only partial contact of the bearing edges 41a. Depending on the diameter of the extruded pipe 10, a number of such lamellae 40a, 40b form with a bearing edge 41a, as shown in FIGS. 2A, 2B, which are respectively arranged offset in relation to one another over the circumference, either a more or less complete circular shape or at least an approximately circular shape. In the exemplary embodiment according to FIGS. 2A, 2B, six lamellae 40a form with their bearing edges 41a, a first bearing unit with an interrupted annular form and six further lamellae 40b of a second lamella ring, which is arranged offset with respect to the lamellae 40a axially in the direction of extrusion of the pipe, form a second lamella ring with bearing edges, the six lamellae 40b here being arranged offset not only axially, but also circumferentially in relation to the six lamellae 40a of the other lamella ring. As a result, the lamellae 40b of one lamella ring lie virtually in the gaps of the lamellae 40a of the other lamella ring with partial overlapping, as can be seen from FIGS. 2A, 2B. In this way, a multiplicity of lamella rings are arranged one behind the other in the axial direction, as can be seen from the representation according to FIGS. 3A, 3B.

If it is then intended for a changing of the outside diameter of the pipe 10 that is to be extruded to take place, the corresponding adaptation is then performed as follows in the calibrating device 3 by the radial adjustment of the spindles 48, and consequently of the lamellae 40a, 40b. A toothed belt 52, which can be driven for example by a motor, engages in a gear ring 51, which is arranged in the region of the outer wall 44 of the housing and can in this way be rotated about a central axis 53 of the calibrating device. The component forming the outer gear ring 51 also has on both sides lateral gear rings 50, 54, which respectively mesh with gear wheels 49, which rotate about an axis 55 and are respectively assigned to the spindles 48 for the radial adjustment of the lamella rings formed from the lamella 40a, 40b. If the gear ring 51 rotates, and consequently also the lateral gear rings 50, 54, about the longitudinal axis of the calibrating device, the gear wheels 49 rotate about the axis 55 perpendicular thereto. Since the gear wheels 49 have internal threads 56 and the spindles 48 are in each case held in a rotationally fixed manner, the rotation of the gear wheels 49 leads to a displacement of the spindles 48 in the direction of the axis 55, and consequently to a radial adjustment of the spindles with respect to the feed axis of the calibrating device and the axis of the extruded pipe 10. The radial displacement of the spindles 48 has the effect that the lamellae 40a, 40b, which are fixedly connected to the latter at the inner end of the spindles, move in the direction of the double-headed arrows 57 in FIGS. 2A, 2B, whereby the lamella rings come to bear against the outer circumference in the case of a pipe of larger or smaller outside diameter.

Cooling pipes 58 are provided, respectively extending parallel to the axis 53 of the calibrating device in the outer regions of the lamellae 40a, 40b. Cooling water can be pumped through these cooling pipes 58, so that the lamellae 40a, 40b, which generally are formed of metal, can be cooled. It may be provided in this respect that water leaves the cooling pipes 58 via bores in the latter in an approximately radial direction with respect to the axis 53 of the calibrating device, so that this water directly reaches the outside wall of the extruded pipe 10, where it provides cooling and also lubrication. As a result, the pipe 10, which has already largely hardened but is still hot in the calibrating device, is cooled when it is fed further through the extrusion system.

FIG. 3B shows once again, in a schematically simplified side view, the adjustment of the individual gear wheels 49 by the gear ring 51 and the toothed belt 52. The view according to FIG. 3B is similar to that of FIG. 3A, although in FIG. 3B the pipe 10 that is to be calibrated and the housing with the outer wall 44 and inner wall 46 have been omitted for better overall clarity, so that the device for the radial adjustment of the threaded spindles 48 can be seen better. The driving force is applied by the toothed belt 52, which is in engagement with the gear ring 51. The gear ring 51 rotates with both its lateral gear rings 50, 54 about the longitudinal axis 53 of the calibrating device, whereby the gear wheels 49, which are in engagement with the lateral gear rings 50, 54, rotate about an axis perpendicular thereto. As a result, the spindles 48, which are in engagement with the gear wheels 49 via an internal thread and are held in a rotationally fixed manner, are displaced radially with respect to the axis 53 and the calibrating device is set to the desired diameter.

Figure 4A:
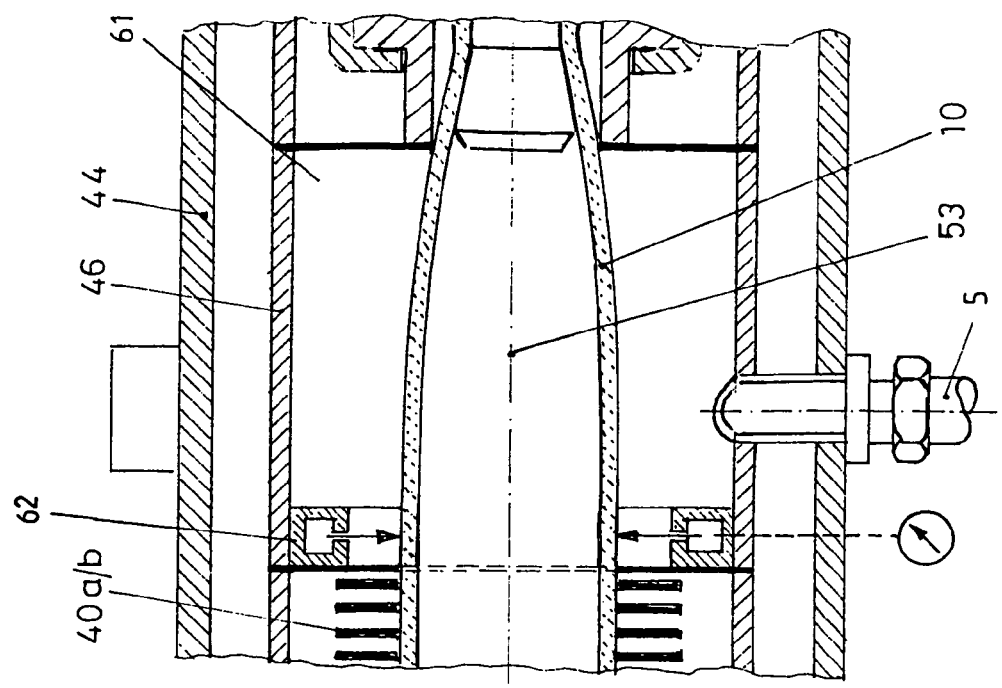
FIG. 4A shows a partial longitudinal section through the extrusion system in the region of the vacuum suction bell in a first position of the calibrating tools.
Figure 4B:
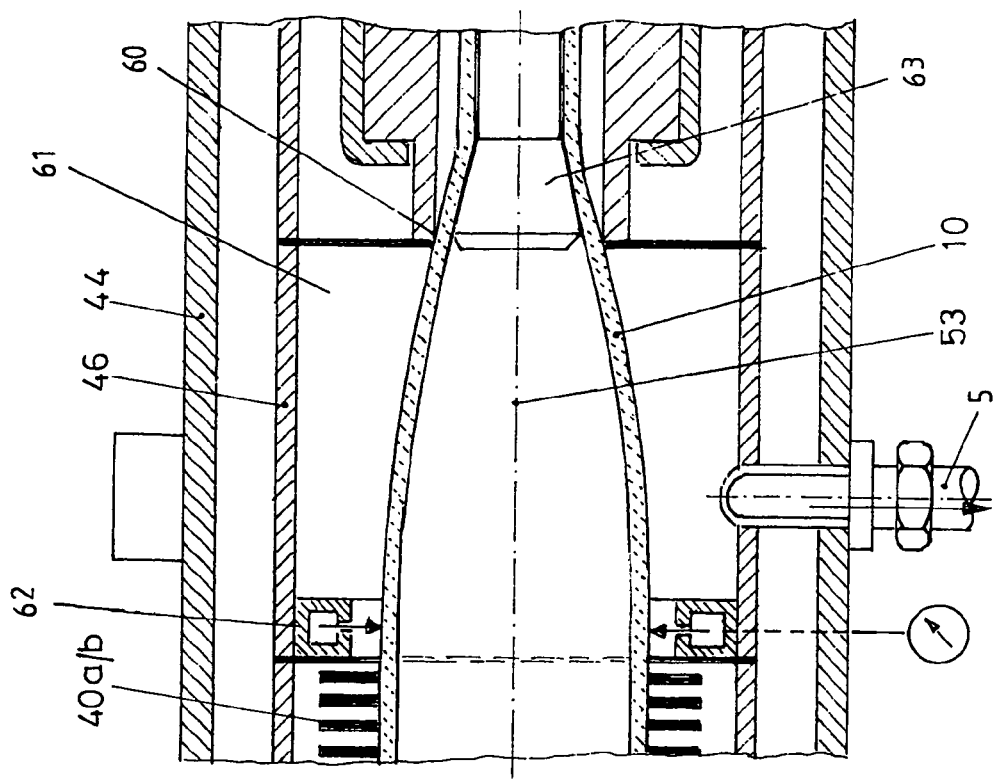
FIG. 4B shows a corresponding longitudinal section through the extrusion system in the region of the vacuum suction bell in a second position of the calibrating tools.

FIGS. 4A and 4B show in a schematically simplified manner, in two views for two different pipe diameters, what takes place in the vacuum suction bell, which is arranged upstream in the direction of extrusion of the lamella rings, which can be seen on the left in the drawing of FIGS. 4A, 4B. In FIGS. 4A, 4B there can be seen an annular gap 60, from which the hot melt of the extruded pipe emerges in a cylindrical strand. The still warm, and consequently still plastic, pipe 10 then passes into a vacuum space 61 of the vacuum suction bell 2 (see also the overall representation according to FIG. 1). If the melt strand is to be widened in the vacuum suction bell, as is the case in both cases according to the representation of FIG. 4A and FIG. 4B, a negative pressure is generated in a vacuum chamber 61 with respect to the pressure in the interior of the pipe 10 and the still plastic melt strand is sucked up, and consequently gradually widened in diameter, until the intended final diameter is reached. What is special about the extrusion system according to the invention is that it is possible to change over to a different pipe diameter while operation is in progress, without any interruption. This takes place by the vacuum in the vacuum space 61 being changed via the vacuum connection 5. The stronger the negative pressure, and with it the greater the suction force in the vacuum space 61 which surrounds the melt strand 10, the stronger the latter is sucked up after its emergence from the annular gap 60, so that a larger pipe diameter can be achieved, as represented by way of example in FIG. 4A. If the suction pressure is lower, the pipe 10 undergoes a smaller widening in the vacuum space 61 of the vacuum suction bell 2, so that a pipe with a smaller outside diameter is obtained at the end of the suction bell section, as represented by way of example in FIG. 4B. Arranged in the end region of the vacuum suction bell 2 is a measuring device 62, which measures the achieved outside diameter of the pipe 10, for example by a laser beam, whereupon a corresponding signal is then emitted to the controller for the adjusting mechanism of the calibrating tools (see FIG. 3B), so that the calibrating tools 40a, 40b adapt themselves to the changed outside diameter of the pipe. What is important in this respect within the scope of the present invention is that, after passing through the vacuum suction bell 2 with the vacuum space 61 and after entry into the calibrating device 3 with the calibrating tools 40a, 40b, the melt strand of the extruded pipe 10 is cooled to the extent that a substantially hardened, rigid pipe strand is obtained. The calibrating tools 40a, 40b therefore have the task of calibrating the outside diameter of the pipe beginning to harden and, for this purpose, must bear against the outer circumference and be set to the changeable set diameter. However, the actual changeover to a different pipe diameter takes place in the vacuum suction bell 2, where the melt strand is still soft, and consequently deformable. It is also possible in principle to achieve a positive pressure in the vacuum space 61 with respect to the pressure in the interior space of the pipe 10, so that in the vacuum chamber 61 the pipe 10 is brought to a set diameter which is smaller than the diameter when it emerges from the annular gap 60 of the extrusion device.

Irrespective of the outside diameter of the extruded pipe, the pipe wall thickness can also be changed, which however takes place in the pipe die head, to be precise by an inner cone 63 being advanced from the position shown in FIGS. 4A and 4B in the axial direction by a drive device not represented here, whereby the annular gap 60 increases, and consequently a greater pipe wall thickness is also achieved, or else the inner cone 63 moves back, whereby the annular gap 60 decreases.

We claim:

1. A device for producing rigid plastic pipes of an approximately cylindrical shape, the device comprising:
    an extruder; and
    a calibrating station disposed downstream of said extruder following in a direction of production, said calibrating station having an axis and calibrating tools for calibrating an outside diameter of an already partly hardened pipe, said calibrating tools bearing against an outside wall of the pipe, said calibrating tools having lamellae and spindles respectively connected to said lamellae, said lamellae being adjustable in a radial direction perpendicular to said axis of the calibrating station and a feed axis of the pipe being extruded for adapting to different desired outside diameters of the pipes being calibrated;
    gear wheels meshing with said spindles, said lamellae forming lamellae rings each having a plurality of said lamellae distributed over a circumference of the pipe being calibrated, said plurality of said lamellae of each of said lamellae rings concurrently radially adjustable by said gear wheels; and
    a gear ring having lateral gear rings concentrically surrounding the pipe;
    said gear wheels meshing with said lateral gear rings of said gear ring, said gear wheels being rotary driven by said lateral gear rings of said gear ring.

2. The device for producing rigid plastic pipes according to claim 1, wherein:
    said spindles each have an external thread and a spindle axis; and
    said gear wheels each have an internal thread and rotate during radial adjustment, said gear wheels engage in said external thread of said spindles and during rotation bring about a displacement of said spindles axially with respect to said spindle axis and radially with respect to the feed axis of the pipe being extruded.

3. The device for producing rigid plastic pipes according to claim 1, further comprising a drive device for rotating said gear ring about said axis of said calibrating station and the feed axis of the pipe.

4. The device according to claim 3, wherein said spindles and said plurality of said lamellae of a plurality of said lamellae rings are concurrently radially adjustable by said gear ring.

5. The device for producing rigid plastic pipes according to claim 1, wherein at least two of said lamella rings are disposed adjacently one behind another in an axial direction with respect to the feed axis of the pipe, said plurality of said lamellae of each of said at least two lamellae rings circumferentially surround the pipe all around.

6. The device for producing rigid plastic pipes according to claim 5, wherein said plurality of said lamellae of one of said at least two lamellae rings are circumferentially offset with respect to said plurality of said lamellae of another one of said at least two lamellae rings.

7. The device for producing rigid plastic pipes according to claim 1, wherein said calibrating station has cooling pipes carrying cooling water for cooling said lamellae.

8. The device for producing rigid plastic pipes according to claim 3, wherein said drive device is a toothed belt engaging in said gear ring.

* * * * *